United States Patent [19]

Tank

[11] Patent Number: 4,652,130
[45] Date of Patent: Mar. 24, 1987

[54] METHOD OF AND ARRANGEMENT FOR AN INTERFEROMETER

[75] Inventor: Volker Tank, Eching, Fed. Rep. of Germany

[73] Assignee: Deutsche Forschungs- und Versuchsanstalt fur Luft- und Raumfahrt e.V., Cologne, Fed. Rep. of Germany

[21] Appl. No.: 683,871

[22] Filed: Dec. 20, 1984

[30] Foreign Application Priority Data

Dec. 22, 1983 [DE] Fed. Rep. of Germany ....... 3346455
Aug. 23, 1984 [DE] Fed. Rep. of Germany ....... 3431040

[51] Int. Cl.$^4$ ............................................. G01J 3/45
[52] U.S. Cl. .................................................. 356/346
[58] Field of Search ......................................... 356/346

[56] References Cited

U.S. PATENT DOCUMENTS 4,383,762  5/1983  Burkert ............................. 356/346

FOREIGN PATENT DOCUMENTS 2811411  9/1979  Fed. Rep. of Germany ...... 356/346

Primary Examiner—Davis L. Willis
Assistant Examiner—Matthew W. Koren
Attorney, Agent, or Firm—Collard, Roe & Galgano

[57] ABSTRACT

In the inventive interferometers, based on the principle of Michelson, an alteration of pathlength is obtained through rotation of a movable mirror, where this mirror is a retroreflector; or an eccentricaly rotating retroreflector laterally deviates a non centric, impinging beam more or less, depending on the angular position of the retroreflector and directs said beam through a fixed wedge of refractive material, whose index of refraction is different from the index of refraction of air. Hence with the inventive interferometers no mechanical back and forth movement of a mirror or wedge is performed. Interferometers of this kind can be used for spectroscopy in a wide region of the electromagnetic spectrum; examples are the spectral analysis in chemistry or the astronomy (for instance in the infrared region).

8 Claims, 6 Drawing Figures

METHOD OF AND ARRANGEMENT FOR AN INTERFEROMETER

BACKGROUND OF THE INVENTION

The present invention relates to a method of and arrangement for an interferometer of the type of Michelson. Interferometers of this kind are used for spectroscopy in a wide region of electromagnetic radiation; examples are, for instance the spectral analysis in chemistry or astronomy (in the infrared region).

In principle these interferometers of Michelson consist in accordance with FIG. 1 of two plane mirrors S1 and S2 perpendicular to each other, one of which (S1) is fixed, the other one (S2) can be moved parallel to itself and a beamsplitter ST under an angle of 45 degrees relative to each of the mirrors, which beamsplitter divides the wave trains of radiation coming from a source Q and impinging upon said beamsplitter into two halves of equal amplitude, one of which halves is transmitted to the (here) fixed mirror S1, the other one is reflected to the movable mirror S2. Reflected by mirrors S1 and S2, the halves of radiation recombine at the beamsplitter ST and reach the detector D.

If the optical path through both arms of the interferometer (with mirrors S1 and S2) is of the same length, then the halves superpose positively and result in a high detector signal;if by displacing the movable mirror S2,the optical paths are different by just $\lambda_S/2$ of a certain wavelength $\lambda_S$, then the two halves superpose negatively, they cancel each other and the detector receives no radiation of wavelength $\lambda_S$. If the mirror is moved continuously over a path of many wavelengths, then for all wavelengths $\lambda_n$ of the impinging radiation, coaddition, cancelling and all states between these take place in turns continuously according to $\lambda_n$. The herewith received detector signal (the interferogram) is the Fournier transform of the spectrum of the impinging radiation; digitizing the interferogram and applying the Fourier transform to it results in the spectrum.

The spectral resolving power of an interferometer is proportional to the path difference of its arms, hence the further the movable mirror is displaced, the higher the resolving power of the instrument is.

In all these well known interferometers of Michelson or in modified versions, the necessary path difference is generated by a back and forth movement of one or even both mirrors of the interferometer. For example the mirror is moved with the aid of a sliding guide (occasionally by using refractive components), or a pendulum, where for successive measurements the mirror has to be moved continuously back and forth. The necessity of moving the mirror back and forth limits the attainable speed of measurements and therefore the time resolution of the measurement. Furtheron in general the instrument cannot be used for measurements when the mirror is moving backwards, because in stopping and reversing the movement, the knowledge of the position of the mirror gets lost. Usually the mirror position is measured with the aid of a laser source and its measurement is necessary to peform the Fourier transform (and also to digitize the interferogram). Moreover, this means however, that it is impossible to measure continuously, only discrete sequences of a continuous event which can be acquired.

High requirements are set on the mechanism of the mirror movement, because during measurement (that is during mirror movement) both mirrors of the interferometer must stay exactly perpendicular to each other, which demands a high effort especially for large mirror displacements (high spectral resolving power) and/or in the case of short wavelengths under investigation.

Also known are interferometers with refractive elements, where the path difference is generated by moving back and forth a wedge or two wedges, resp. a prism or two prisms in one or both arms of the interferometer. FIG. 2 shows the principle design of such an interferometer, where the two fixed mirrors S1' and S2' can be either plane mirrors or retro reflectors. K1' and K2' are two identical wedges (prisms) made of a material, which has a different refractive index $n_k$ than air. ST' is the beamsplitter which can be made in form of a coating, applied to the backside of one of the wedges K1' or K2', or can be placed between the two surfaces of the wedges K1' and K2', that are facing each other. From the source Q' the radiation emerges and after interference it will be measured by the detector D'.

This interferometer has equal pathlengths in both arms, when the distances from mirror S1' respectively S2' to the beamsplitter ST' are the same and simultaneously the wedges K1' and K2' are not displaced with regard to each other, respectively they must be symetric with regard to the beamsplitter ST'. If one of the wedges, for example wedge K2' as indicated in dotted lines in FIG. 2, is displaced along the beamsplitter ST', for instance in the direction of its vertex, then the radiation has to traverse distances of different lengths in air and in the wedge material with regard to the both arms of the interferometer; this results in different optical pathlengths as long as the refractive index $n_k$ of the wedge material is different from the refractive index $n_L$ of air. Therefore, by moving back and forth one of the wedges K1' and K2' in the described manner, it is possible to generate different optical pathlengths in both arms of the interferometer without changing the geometrical pathlengths. These considerations are based on the following equation:

$$d_O = n \cdot d_g \qquad (1)$$

where:
$d_O$ = optical pathlength
n = refractive index of material (wedge)
$d_g$ = geometrical pathlength.

Known are different types of interferometers using refractive components; in all types the pathdifference is generated by moving back and forth one or more optical elements. The movement(s) must be performed with high precision, therefore much effort is necessary in bearing and driving the movable components.

In accordance with the above explanations according to the state of the art of practical interferometers applied methods and arrangements are considered to have certain disadvantages besides the fact, that they demand a relatively great effort,these disadvantages are:

(a) performance of a back and forth movement
(b) therefore a limited speed of measurement
(c) really uninterrupted measurements are not possible.

This is caused mainly by the fact, that the movable elements have to be accelerated and stopped all the time. As another disadvantage is the fact, that due to the necessary bearing of the movable elements, an operation of the interferometer is possible in general only in horizontal position, at least not in any orientation.

SUMMARY OF THE INVENTION

Accordingly, it is an object of the present invention, to provide a method of and arrangement for an interferometer of the kind of Michelson, avoiding the disadvantages and problems noted, with the aim to achieve with less effort really uninterrupted and continuous measurements of spectra at very high speed with an interferometer in any orientation in space, without moving components back and forth.

This is obtained with an interferometer according to This object is accomplished according to the present invention by providing an interferometer, based on the principle of Michelson, consisting of a first fixed plane mirror, a beamsplitter, as the movable mirror a rotating retroreflector, and a second fixed plane mirror arranged perpendicular to the first fixed plane mirror; wherein the axis of rotation of the retroreflector is displaced relative to its axis of symmetry, with respect to its center of symmetry, the axis of rotation and the axis of symmetry being tilted with respect to each other, the axis of rotation of the retroreflector being displaced relative to the optical axis of the interferometer, and said axis of rotation and said optical axis do not intersect on the reflecting surface of the retroreflector and both axes are tilted with respect to each other. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 4: a schematic sectional view of a different preferable embodiment of the inventive arrangement of the interferometer FIG. 5: a schematic top view of the arrangement of FIG. 4

FIG. 6: a top view of a different arrangement of the invention.

DESCRIPTION OF PREFERRED EMBODIMENT

Figure 3:
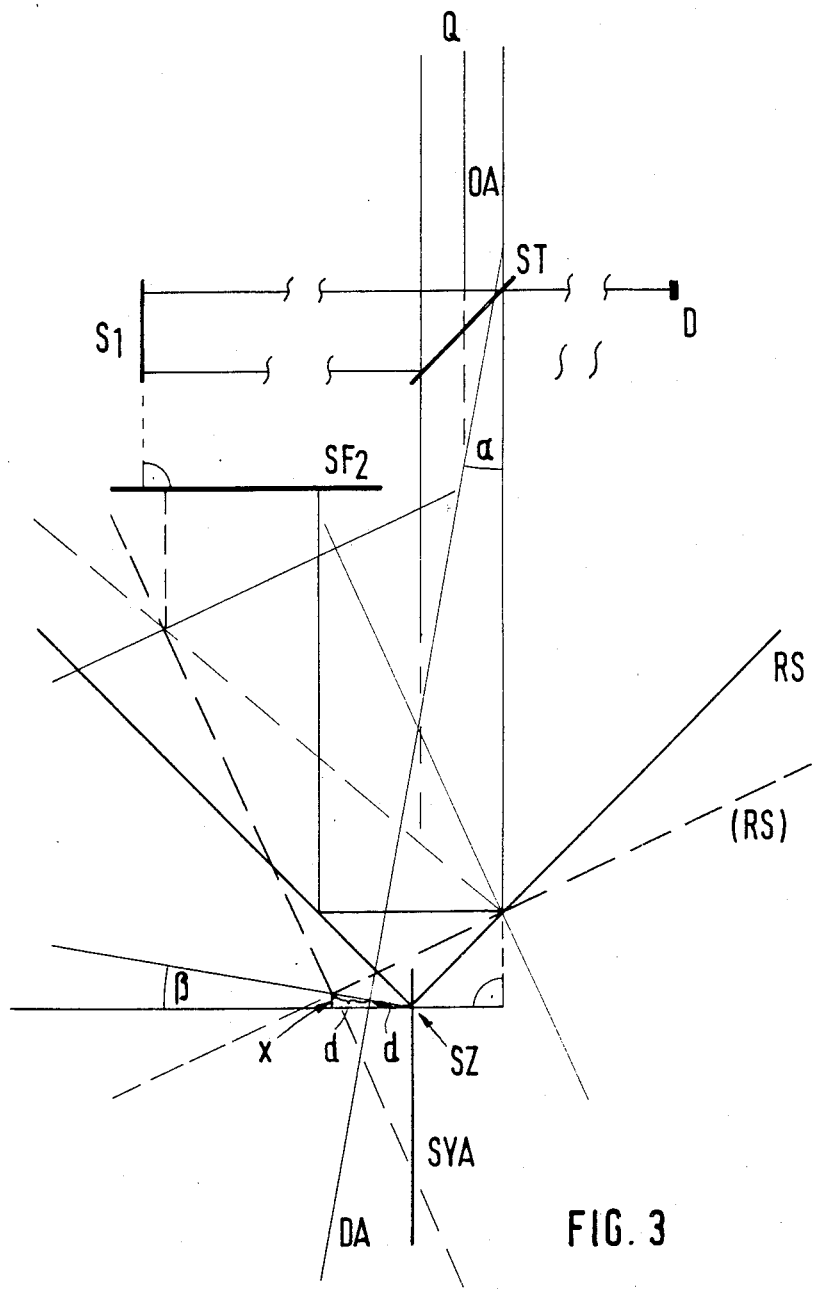
FIG. 3: a schematic sectional view of a preferable embodiment of the inventive arrangement of the interferometer

A preferable embodiment of the inventive arrangement with reference to FIG. 3 contains besides the fixed mirror S1 a second fixed mirror SF2, and as the movable mirror of the interferometer a retroreflector (triple reflector) RS is used, which is provided with an axis of rotation DA and designed to rotate around this axis (with any realistic speed), whereas this said axis of rotation is displaced in reference to the optical axis OA of the interferometer; furthermore both axes DA and OA are tilted against each other and the tiltangle between them is denoted $\alpha$; preferable the axis of DA is placed in the plane determined by the two arms of the interferometer. The retroreflector RS in dotted lines shows the retroreflector RS in a different position of the rotation.

Figure 2:
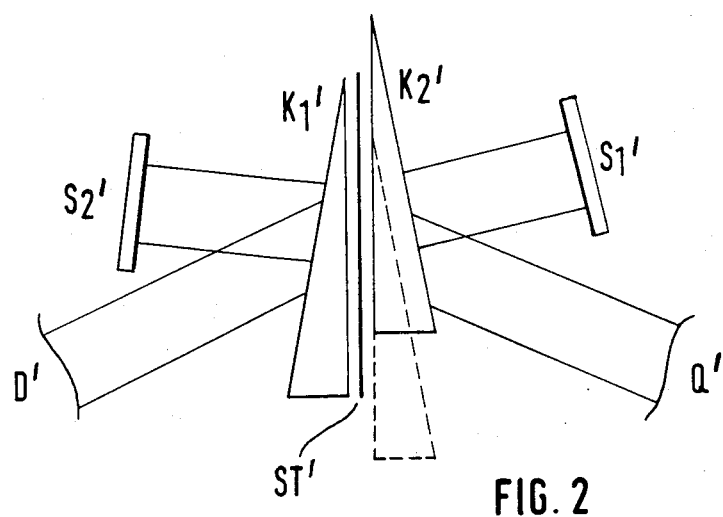
FIG. 2: another schematic sectional view of a conventional interferometer with refractive elements

Furthermore the axis of rotation DA of the retroreflector RS is displaced in reference to the axis of symmetry SYA of the retroreflector RS and these two axes are tilted relative to each other and the tiltangle between them is denoted $\beta$ (FIG. 3); hence axis of rotation DA and axis of symmetry of SYA of the retroreflector RS are not parallel. The displacement of the axis of rotation DA with regard to the other two axes (namely the optical axis OA of the interferometer and the axis of symmetry SYA of the retroreflector RS), as well as the angle of tilt of the axis of rotation DA with regard to the axis of symmetry SYA of the retroreflector and with regard to the optical axis OA of the interferometer and also the whole arrangement in their construction and dimensions are designed in a way, that in any position of the rotating retroreflector RS its one half is opposite the beamsplitter ST of the interferometer and receives in its whole the radiation coming from from the beamsplitter; its other half is in any position opposite the second fixed mirror SF2, which in any case receives completely the radiation, which is reflected by the retroreflector RS towards this second fixed mirror SF2. Furthermore the mirror SF2 must be perpendicular to the first fixed mirror S1 of the interferometer. The remaining part of the interferometer can be arranged accordning to one of the known designs, for example a conventional Michelson interferometer (FIG. 2 shows schematically such an interferometer), or in form of any modification thereof.

In a single complete rotation of the retroreflector RS the displacement and tilt of its axis of rotation DA (with regard to the other two axes) cause a change of (the pathlength) the distance between the fixed reference points (namely the beamsplitter ST and the second fixed mirror SF2); if for example the rotation is started at an angular position of the rotating retroreflector RS, at which position the pathlength is the minimum, then the pathlength increases until the maximum is reached (after half a (single) rotation), and then it decreases to the minimum again (which is reached after a (single) complete rotation). This is caused by the described arrangement of the three axes namely the optical axis OA of the interferometer, the axis of symmetry SYA of the retroreflector and the axis of rotation DA of the retroreflector, through the fact, that under rotation of the retroreflector RS this retroreflector RS is displaced horizontally as well as vertically with regard to the fixed reference points (ST and SF2). Hence under continuous rotation of the retroreflector RS the path difference changes continuously, taking turns between maximum and minimum.

Furtheron the combination of retroreflector RS and second fixed mirror SF2 causes, the radiation passing this arm of the interferometer, under all mirrorpositions to return exactly to the spot on the beamsplitter ST from which it came. $\alpha$ is the angle of tilt between axis of rotation DA and axis of symmetry SYA of the retroreflector RS. $\beta$ is the angle of tilt between the optical axis OA of the interferometer and the axis of rotation DA of the retroreflector. If $\alpha = \beta$, then the maximum of the path difference $\chi$ between the second fixed mirror SF2 and the beamsplitter ST (between the two extreme positions of the retroreflector) is calculated according to the following equation $$\chi = 2d \cdot \sin\alpha \qquad (2)$$

where d is the displacement of the retroreflector RS with regard to its axis of symmetry SYA (where the displacement is measured from the center of symmetry SZ perpendicular to the axis of rotation DA and where the center of symmetry SZ is that spot on the retroreflector from which a parallel to the axis of symmetry SYA impinging beam is reflected into itself, hence the vertex of a triple reflector). Since the radiation traverses the arms of the interferometer twice, the maximum of the optical path difference is:

$$2\chi = 4d \cdot \sin\alpha \qquad (3)$$

Both arms of the interferometer (namely the one with the fixed mirror S1 and the one with the rotating retroreflector RS) are aligned in known manner, so that the pathlength of both arms is the same, when the pathlength in the arm with the rotating retroreflector RS is the minimum, respectively the pathlength in the arm with the fixed mirror S1 can be longer by a few wavelengths (of the longest investigated wavelength) than the minimum of the pathlength in the arm with the rotating retroreflector RS. The latter case of alignment is the more used one, because in this way at the beginning of the measurement an interferogram at both sides of the point of symmetry of the interferogram is obtained, which is used in a known manner under calculation of the spectrum for a phase correction. The pathlengths can be adjusted of course, to obtain a completely symmetric interferogram.

According to the above explanations a continuous alteration of pathlength in one arm of the interferometer is achieved exclusively by rotation of the retroreflector RS, without moving any part of the instrument back and forth. Hence in this interferometrical arrangement the mirror does not need to be stopped and accelerated in turns, but rotates continuously. Therefore with the inventive method and arrangement it is not only possible to use a technical simple and precise bearing for the moving mirror with less effort, but it is also possible to perform the drive and (electronic) control of the mirror movement with reduced effort.

Figure 1:
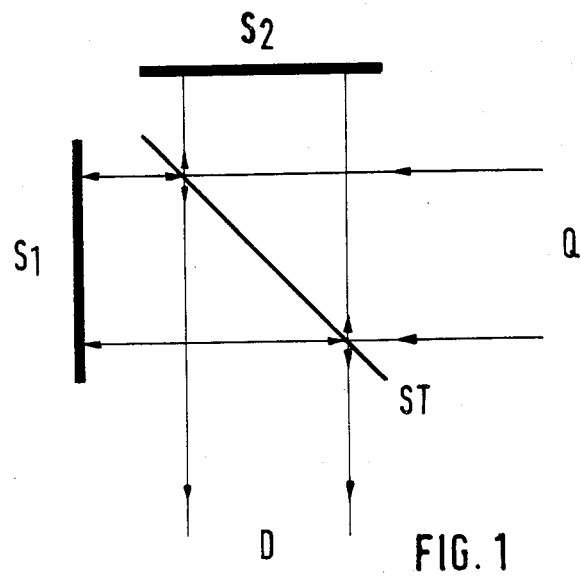
FIG. 1: a schematic sectional view of a conventional interferometer

It has to be considered as a special advantage, that (through the use of the retroreflector RS) during its rotation the mirrors S1 and SF2 stay perpendicular to each other all the time (which can be achieved with very high effort only in an arrangement with mirror S2 moving back and forth (FIG. 1) together with mirror S1); prior to measurements the mirrors S1 and SF2 (FIG. 3) respectively S1 and S2 (FIG. 1) have to be adjusted to be perpendicular to each other, of course.

In another preferred embodiment of the inventive arrangement—with reference to FIG. 4—together with the general beamsplitter ST', a fixed plane mirror S1' and a second fixed plane mirror SF2, as movable mirror of the interferometer IF' a retroreflector RS' is used, for example a triple reflector; this retroreflector RS' is designed to rotate with a predetermined, preferred speed around the axis of rotation DA'; the axis of rotation DA' of the retroreflector RS' is parallel to the optical axis OA' of the interferometer F' and is displaced with regard to this (OA'). Furtheron the axis of rotation DA' of the retroreflector RS' is parallel to the axis of symmetry SYA' of the retroreflector RS' and displaced with reference to this (SYA'). The parallelism of the three axes DA', OA' and SYA' is useful to achieve a simple arrangement and for simplicity and better clarity of the description; it is not necessary for the function of the interferometer. However it is necessary, that the three axes DA', OA' and SYA' or two of them do not coincide.

As the element that generates the pathlength difference, there is between the beamsplitter RS' and the second fixed mirror SF2 a wedge K' ( a prism), consisting of a material, whose refracting index $n_k$ is different than the refracting index $n_L$ of air. It is advantageous to arrange this wedge K' in a way, that its plane of symmetry SE', which is the plane that is given by its refracting edge BK' and the perpendicular projection of this said edge BK' onto the base plane B' of the wedge K', is orientated perpendicular to the plane, which is given by the optical axis OA' of the interferometer IF' and the axis of rotation DA' of the retroreflector RS', if the latter two axes—as in this case—are parallel and which said plane of symmetry SE' is therefore parallel to the second fixed mirror SF2. In the case of a nonparallel arrangement of the axes OA' and DA' the plane of symmetry SE' of the wedge K' should be perpendicular to the optical axis OA' of the interferometer IF' and hence, parallel to the second fixed mirror SF2. In principle it is of no importance whether the refracting edge BK', as in FIG. 4 and FIG. 5, or the baseplane B' of the wedge K' is opposite the beamsplitter ST'.

By appropriate arrangement of the axes OA', DA' and SYA' and of all the other parts it has to be guaranteed that—with reference to FIG. 4—a bundle of rays SB' of radiation coming from the beamsplitter ST' into the arm with wedge K' and retroreflector RS':

(a) after leaving the beamsplitter ST' traverses in its entirety the wedge K'

(b) displaced by the retroreflector RS' traverses a second time the wedge K'—and where the bundle of rays SB' after the second pass through the wedge again is parallel to the optical axis OA' of the interferometer IF', so that the deviation of the bundle, which is caused by the first pass, is reversed by the second pass and hence the said bundle SB' impinges perpendicular upon the second fixed mirror SF2, and (c) is reflected by said second fixed mirror SF2 so that the bundle of rays SB' traverses the same way as from the beamsplitter ST to the fixed mirror SF2, now in reversed direction from the fixed mirror SF2, via the retroreflector RS' to the beamsplitter ST'. Hence the bundle of rays SB' traverses the wedge K' twice on "the way there", and twice on the "return path" (with regard to the second fixed mirror SF2).

Since the retroreflector RS' (for example a triple reflector) reflects the bundle of rays SB' "upside down" (with regard to all directions), the described arrangement and the double pass through the wedge K' cause, that all parts of the bundle of rays traverse the same pathlength through the wedge, independent of whether they impinge upon the wedge K' at its narrow or its broad end; the bundle of rays SB' so to say "sees" a plane parallel plate, which it traverses twice when traversing the wedge K' four times (see FIG. 4 regarding the bundle of rays SB'). Besides that, the first and the second two consecutive passes through the wedge K' cause, that the deviation of the bundle of rays SB' due to the refraction is reversed, so that the bundle of rays SB' is parallel to the optical axis OA' and hence impinges perpendicularly upon the mirror SF2, under the assumption that latter mirror SF2 is aligned correctly, that means perpendicular to the fixed mirror S1' and under 45 degrees to the beamsplitter ST', and then said bundle SB' returns to its origin at the beamsplitter ST'. During rotation of the retroreflector RS' around its axis of rotation, said retroreflector RS' will be displaced relative to the optical axis OA' of the interferometer IF', through which of course also the bundle of rays SB' is deviated (displaced laterally) and hence the second and third passes through the wedge K' will take place at different locations (on the wedge K') depending on the position of the retroreflector RS' under its rotation, therefore the bundle of rays SB' has to pass varying thicknesses of the wedge K'. Under rotation of the retroreflector RS; which can and should be continuously, hence the bundle of rays SB' traverses in continuous turns steadily increasing up to a maximum and then steadily decreasing down to a minimum of thicknesses of the wedge K' and therefore said bundle traverses different optical passlengths. Due to the double passes through the wedge K' the bundle of rays SB' "sees" a plane parallel plate of periodically steadily changing thickness. Between maximum and minimum respectively minimum and maximum at the detector D' one side (one half) of the interferogramm (which is symmetric with reference to maximum-minimum-maximum) is recorded in a known manner, digitized and computed into the spectrum with the help of the Fourier transform.

From the above explanations and with reference to FIG. 4 it easily follows, that arrangement and dimensions of the components must guarantee:

(a) that the bundle of rays SB', after the first pass through the wedge K' and the so caused deviation, is not reflected into itself by the retroreflector RS', that means, that in any position of the rotating retroreflector RS', the optical axis of the bundle of rays SB' does not hit the center of symmetry SZ' of said retroreflector (where the center of symmetry SZ' is that spot on the retroreflector, from which a parallel to the axis of symmetry SYA' impinging beam is reflected into itself); in the case of a triple reflector the center of symmetry is its vertex, (b) that in parallel arrangement of the axes DA', OA' and SYA' the optical axis of a bundle of rays, after the first pass through the wedge K', does not coincide with the axis of rotation DA'. (The optical axis of the bundle of rays SB' may only coincide with the axis of rotation DA', if the axis of rotation DA' and the axis of symmetry SYA' of the retroreflector are tilted against each other), (c) that the used wedge K' is large enough, so that every bundle of rays reflected by the retroreflector RS' has to pass through the wedge K'; and (d) that also the fixed mirror SF2 is so large (extended), that every bundle of rays, which has been reflected by the retroreflector RS', again is reflected by said fixed mirror SF2.

According to the above, there are—among others—two arrangements possible, which are plotted in FIG. 5, resp. FIG. 6 in top view. In FIG. 5 and FIG. 6 USZ denotes a circle, which is the path of the center of symmetry SZ' of the retroreflector RS' under rotation; ERS denotes that point of the retroreflector RS', which has the longest distance to the axis of rotation DA' and UERS denotes a circle which is the path of this said Point ERS under rotation.

In FIG. 5 a bundle of rays SB' may impinge outside the circle USZ (the path of the center of symmetry SZ') upon the retroreflector RS'. Since the projection of each reflected ray passes the center of symmetry SZ' of the reflecting retroreflector (for example a triple mirror), the area, that can be reached by the bundle of rays SB', is given and indicated by the dotted line BSB: this area hence has to be covered by the second fixed mirror; also the wedge K' has to cover the area limited by the line BSB and furthermore also the area which is covered by the bundle of rays SB' when entering the arm with the retroreflector.

In FIG. 6 a bundle of rays SB' may impinge inside the circle USZ (the path of the center of symmetry SZ') upon the retroreflector RS'. In this case, under rotation of the retroreflector, the bundle of rays reflected by said retroreflector moves around the axis of rotation and around the incoming bundle SB'. The fixed mirror SF2 and the wedge K' hence have to cover areas around the entering bundle SB', whereas the fixed mirror SF2 must have a hole at the appropriate place, through which hole the bundle of rays SB' enters; the hole must have exactly the same diameter as the bundle of rays SB'. The orientation of the base plane B' and the refracting edge BK' of the wedge K' may be any in the different arrangements; under rotation its only influence is the dependence of the maximum resp. minimum of the optical path on the respective (angular) position of the retroreflector.

In all different arrangements both arms of the interferometer, namely the one with the fixed mirror S1' and the one with the rotating retroreflector RS', are aligned in known manner, so that the pathlength of both arms is the same, when the pathlength in the arm with the rotating retroreflector RS' is the minimum, respectively the pathlength in the arm with the fixed mirror S1', can be longer by a few wavelengths (of the longest investigated wavelength) than the minimum of the pathlength in the arm with the rotating retroreflector RS'. The latter case is the more used one, because in this case at the beginning of the measurement an interferogram at both sides of the point of symmetry of the interferogram is obtained, which is used in a known manner under calculation of the spectrum for a phase correction. The pathlengths can be adjusted of course to obtain a completely symmetric interferogram.

Hence in the above described arrangements, a continuous alteration of pathlength in one arm of the interferometer is achieved exclusively by rotation of the retroreflector RS', without moving any part of the instrument back and forth. Hence in this inventive interferometrical arrangement for measurement, the refractive wedge does not need to be stopped and accelerated in turns but instead the retroreflector RS' rotates continuously with a constant velocity. Therefore with the inventive method and arrangement it is not only possible, to use a technically simple and nevertheless precise bearing for the moving mirror (the rotating retroreflector RS') with less effort, but it is also possible, to perform the drive and (preferable electronic) control of the mirror movement with substantially reduced effort.

Compared to the earlier described known interferometers, the following have to be considered as the main advantages of the present invention:

(a) uninterrupted measurements can be performed (no time gaps), (b) slow as well as especially very fast measurements can be performed, (c) with less effort concerning construction an interferometer can be obtained, which is insensitive to vibration and shock, (d) due to the reduced effort concerning electronics and mechanics a rugged, small interferometer can be obtained, which especially together with a suitable microprocessor can be arranged as a portable, compact spectrometer, and (e) because of the simple, universal bearing of the moving mirror, in the form of the rotating retroreflector RS resp.RS', an operation of the interferometer in any orientation in space is possible, and (f) in parallel arrangement of the three axes DA', SYA', OA', in any position of the rotating retroreflector RS', the beam of rays SB' impinges upon the surface of said retroreflector under the same (or nearly the same) angle, and that therefore in any position, the polarization of the radiation caused by said retroreflector is the same (resp.nearly the same).

As material for the refractive wedge K' the generally used materials can be utilized, however attention must be paid to the spectral region of the respective application, by using for example optical glasses for the region of visible light, CaF, KBr, Irtran, etc. in the infrared region.

It is possible of course, to arrange the inventive interferometers with reference to FIG. 3 up to FIG. 6 according to embodiments of the principle of Michelson described in the literature, for example as polarizing interferometers. The alignment of the fixed mirror, the measurement of the mirrorposition (pathlength) and so on, can be performed in known manner, for example the measurement of the pathlength can be performed with the aid of laser and white light sources within the path of rays, or by arrangement of a respective reference interferometer.

The kind retroreflector, of wedge, of and second fixed mirror which are used, their geometric dimensions, the tilt and displacement of the three axes, as well as the surface finish of the elements have to be suited in known manner to the respective application of measurement. The same is true for the bearing of the mirror, the speed of rotation, and for the necessary electronic circuits. The wedge K' should (not necessarily) be used in its minimum of deflection, with reference to the optical axis OA'.

Also the fixed mirror S1 resp.S1' can be a fixed triple reflector (retroreflector). In general the inventive interferometers can be installed in any presently used interferometer arrangement, in which the alteration of pathdifference is accomplished by any kind of back and forth movement. The mirror S1 resp.S1' can also be a combination of a retroreflector and a fixed mirror, resp. a combination of a rotating retroreflector and a refractive wedge together with a fixed plane mirror; in this way possible aberrations can be compensated and greater pathlength differences can be achieved. By controlling the phase of the two rotations (of the two retroreflectors) with reference to each other, also herewith the speed behaviour of the alteration of pathlength can be influenced.

Furtheron the described method can be applied, to construct any type of spectrometer, if for this said type of spectrometer altering pathlengths are necessary. In general it is necessary to appropriately balance the rotating retroreflector.

It will be understood that each of the elements described above, or two or more together, may also find a useful application in other types of constructions differing from the types described above.

While the invention has been illustrated and described as embodied in a method of and an arrangement for an interferometer, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An interferometer having an optical axis, based on the principle of Michelson, comprising:
    a first fixed plane mirror, a beamsplitter centered with respect to the optical axis of said interferometer, opposing said first fixed mirror, and oriented at an angle of about 45° to the plane of said first fixed mirror;
    a rotating retroreflector with two arms serving as a movable mirror and having a reflecting surface, an axis of symmetry, an axis of rotation, and a center of symmetry; and
    a second fixed plane mirror arranged perpendicular to said first fixed plane mirror and mounted between said first fixed mirror and said retroreflector, thereby leaving an unobstructed optical path between said beamsplitter and said retroreflector, wherein said axis of rotation of said retroreflector is displaceable relative to the axis of symmetry of said retroreflector, with respect to its center of symmetry, said axis of rotation and said axis of symmetry have a beta tilt angle therebetween with respect to each other, said axis of rotation of said retroreflector also being displaceable relative to the optical axis of the interferometer, said axis of rotation and said opical axis not intersecting on said reflecting surface of said retroreflector with the optical axis of the interferometer and said axis of rotation being tilted with respect to each other, said beamsplitter having a diameter approximately one and a half times that of said first fixed mirror, said rotating retroreflector and said second fixed mirror of the interferometer being dimensioned and arranged with respect to each other in such a way, that in operation, the entire radiation, coming from said beamsplitter, is collected by one arm of said retroreflector, is reflected via its other arm towards said second fixed mirror, which collects it in its entirety and from which second fixed mirror the entire radiation is reflected back to said beamsplitter on a reverse path by having said second fixed mirror also dimensioned so as to be a relatively small multiple of the diameter of said first fixed mirror, and by having said retroreflector dimensioned so as to be a relatively larger multiple of the diameter of said first fixed mirror, with said optical axis and said axis of rotation having an alpha tilt angle therebetween of about 5° to 15°.

2. The interferometer as defined in claim 1, wherein said second fixed mirror has a diameter of about from three to five times the diameter of said first fixed mirror, depending upon a desired spectral resolution.

3. The interferometer as defined in claim 1, wherein said retroreflector has a diameter of from eight to ten times the diameter of said first fixed mirror, depending upon a desired spectral resolution.

4. The interferometer as defined in claim 1, wherein said retroreflector is a triple reflector.

5. The interferometer as defined in claim 1, wherein said retroreflector is a cat's eye.

6. The interferometer as defined in claim 1, further comprising a variable speed electric motor attached to and driving said retroreflector, wherein high speeds of the motor allow for spectral measurements having a high resolution in time.

7. The interferometer as defined in claim 1, wherein the interferometer has two arms which define a plane, and said axis of rotation of said retroreflector is tilted with respect to said axis of symmetry of said retroreflector, said axis of rotation lying within a plane parallel to the plane defined by the two arms of the interferometer, which latter plane is defined by said optical axis in a direction towards said retroreflector, as well as by said optical axis in a direction towards said first fixed mirror, and wherein said alpha tilt angle between said axis of rotation and said optical axis equals said beta tilt angle between said axis of rotation and said axis of symmetry, with both alpha and beta tilt being in the range of up to about 15°.

8. The interferometer having an optical axis based on the principle of Michelson, comprising:

at least one refracting element, a first fixed mirror defining a plane, a second fixed mirror oriented perpendicular to said first fixed mirror, a beamsplitter center with respect to the optical axis of the interferometer, opposing said first fixed mirror, and oriented at an angle of about 45° to the plane of said first fixed mirror; and a movable element comprising a rotating retroreflector having a reflecting region, an axis of rotation and an axis of symmetry which are either parallel or tilted with respect to each other, such that said axis of rotation and axis of symmetry do not coincide with each other or with said optical axis of the interferometer, with at least one of said axis of rotation and axis of symmetry being tilted or parallel with reference to said optical axis, said axis of rotation intersecting said reflecting region, said optical axis intersecting and reflecting surface in any position of said rotating retroreflector, wherein a fixed wedge with an index of refraction which is different from the index of refraction of air is used as a refractive element, and said fixed wedge is arranged between said beamsplitter and said rotating retroreflector and said second fixed mirror in such a way, that in any angular position of said rotating retroreflector, a first bundle of rays, coming from said beamsplitter, traverses said wedge which acts as a prism, with the bundle then impinging upon said retroreflector, being reflected under lateral displacement by said retroreflector, traversing said wedge at a different location again, impinging perpendicularly upon said second fixed mirror, being reflected by said second fixed mirror and traversing back in reverse to the beamsplitter, where said bundle of rays interferes with a second bundle of rays, coming from said first fixed mirror, said beamsplitter having a diameter of approximately one and a half times that of said first fixed mirror and said second fixed mirror being a few times the size of said first fixed mirror and said second fixed mirror displaced aside with respect to said beamsplitter, thereby not obstructing the optical path between beamsplitter and said refractive wedge, said retroreflector of approximately two to three times the size of said second fixed mirror and said refractive wedge of approximately one to one and a half times the size of the retroreflector.

* * * * *